US012608538B2

(12) United States Patent
Seshadri et al.

(10) Patent No.: US 12,608,538 B2
(45) Date of Patent: Apr. 21, 2026

(54) METHOD AND SYSTEM FOR PERFORMING AUTOMATIC SCHEMA-BASED DATA VALIDATION

(71) Applicant: JPMorgan Chase Bank, N.A., New York, NY (US)

(72) Inventors: Dilip Seshadri, Bengaluru (IN); Abhishek Rajashekhar, Tumakuru (IN); Parikshith C R, Mysuru (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 215 days.

(21) Appl. No.: 18/425,699

(22) Filed: Jan. 29, 2024

(65) Prior Publication Data

US 2025/0200275 A1      Jun. 19, 2025

(30) Foreign Application Priority Data

Dec. 14, 2023     (IN) .............................. 202311085480

(51) Int. Cl.
*G06F 17/00*          (2019.01)
*G06F 40/103*         (2020.01)
*G06F 40/18*          (2020.01)

(52) U.S. Cl.
CPC ............ *G06F 40/18* (2020.01); *G06F 40/103* (2020.01)

(58) Field of Classification Search
CPC ............................... G06F 40/18; G06F 40/103
See application file for complete search history.

(56) References Cited

U.S. PATENT DOCUMENTS

| | | | | |
|---|---|---|---|---|
| 7,747,945 B1 * | 6/2010 | Babka | ................... | G06F 40/226 |
| | | | | 715/237 |
| 7,890,479 B2 * | 2/2011 | Chen | ..................... | G06F 40/131 |
| | | | | 707/701 |
| 8,024,339 B2 * | 9/2011 | Barker | ................ | G06F 21/6245 |
| | | | | 707/736 |
| 8,255,372 B2 * | 8/2012 | Medi | ..................... | G06F 40/143 |
| | | | | 707/701 |
| 8,996,391 B2 * | 3/2015 | Stibel | ...................... | G06F 16/27 |
| | | | | 705/347 |
| 9,424,238 B2 * | 8/2016 | Tatiyants | .............. | G06F 40/166 |
| 9,431,053 B2 * | 8/2016 | Cai | ..................... | G11B 20/1426 |
| 9,996,521 B2 * | 6/2018 | Cudak | ..................... | G06F 40/18 |
| 10,055,444 B2 * | 8/2018 | Arora | .................... | G06F 16/248 |

(Continued)

*Primary Examiner* — Laurie A Ries
(74) *Attorney, Agent, or Firm* — GREENBLUM & BERNSTEIN, P.L.C.

(57)          ABSTRACT

A method and a system for performing schema-based data validation are disclosed. The method includes receiving a first dataset that comprises a plurality of entries, the first dataset is received from at least one data source. Next, the method includes receiving a second dataset that comprises a predefined set of instructions corresponding to a set of conformity standards for validation of the first dataset. Next, the method includes applying the predefined set of instructions to the received first dataset. Next, the method includes validating each of the plurality of entries of the first dataset based on the applying of the predefined set of instructions. Thereafter, the method includes generating a consolidated assessment report based on the validation, and displaying, using a display unit, the generated consolidated assessment report.

20 Claims, 5 Drawing Sheets

400

Start

RECEIVE A FIRST DATASET THAT COMPRISES A PLURALITY OF ENTRIES, THE FIRST DATASET IS RECEIVED FROM AT LEAST ONE DATA SOURCE S402

RECEIVE A SECOND DATASET THAT COMPRISES A PREDEFINED SET OF INSTRUCTIONS CORRESPONDING TO A SET OF CONFORMITY STANDARDS FOR VALIDATION OF THE FIRST DATASET S404

APPLY THE PREDEFINED SET OF INSTRUCTIONS TO THE RECEIVED FIRST DATASET S406

VALIDATE EACH OF THE PLURALITY OF ENTRIES OF THE FIRST DATASET BASED ON THE APPLYING OF THE PREDEFINED SET OF INSTRUCTIONS S408

GENERATE A CONSOLIDATED ASSESSMENT REPORT BASED ON THE VALIDATION S410

DISPLAY, USING A DISPLAY UNIT, THE GENERATED CONSOLIDATED ASSESSMENT REPORT S412

End

(56)          References Cited

U.S. PATENT DOCUMENTS

| | | | | |
|---|---|---|---|---|
| 10,540,333 | B2 * | 1/2020 | Ackner | G06F 40/205 |
| 10,606,825 | B1 * | 3/2020 | Sosonkin | G06F 21/6227 |
| 11,941,525 | B2 * | 3/2024 | Morin | G06F 18/2155 |
| 12,248,448 | B1 * | 3/2025 | Balakrishnan | G06F 16/24545 |
| 12,314,157 | B2 * | 5/2025 | Anusuri | G06F 11/3684 |
| 2004/0189708 | A1 * | 9/2004 | Larcheveque | G06F 40/143 |
| | | | | 715/780 |
| 2004/0226002 | A1 * | 11/2004 | Larcheveque | G06Q 40/04 |
| | | | | 705/37 |
| 2007/0136237 | A1 * | 6/2007 | Barker | G06F 21/6227 |
| 2010/0023471 | A1 * | 1/2010 | Baldwin | G06F 40/18 |
| | | | | 706/47 |
| 2013/0007068 | A1 * | 1/2013 | Pitschke | G06F 40/205 |
| | | | | 707/E17.005 |
| 2013/0166515 | A1 * | 6/2013 | Kung | G06Q 10/063 |
| | | | | 707/690 |
| 2015/0026136 | A1 * | 1/2015 | Rathod | G06F 16/122 |
| | | | | 707/692 |
| 2016/0179313 | A1 * | 6/2016 | Ho | G06F 18/2178 |
| | | | | 715/776 |
| 2017/0228821 | A1 * | 8/2017 | Reimer | G06Q 10/063 |
| 2019/0034476 | A1 * | 1/2019 | Arora | G06F 21/6227 |
| 2020/0210389 | A1 * | 7/2020 | Swami | G06F 16/215 |
| 2021/0034603 | A1 * | 2/2021 | Mercier | G06F 16/2365 |
| 2023/0273900 | A1 * | 8/2023 | Vera-Ciro | G06F 40/279 |
| 2024/0045855 | A1 * | 2/2024 | Kondakindi | G06F 16/24532 |
| 2024/0184754 | A1 * | 6/2024 | Ackner | G06F 40/205 |
| 2024/0220715 | A1 * | 7/2024 | Khan | G06F 40/18 |
| 2025/0021469 | A1 * | 1/2025 | Anusuri | G06F 11/3684 |
| 2025/0156812 | A1 * | 5/2025 | Erez | G06Q 10/06313 |
| 2025/0284670 | A1 * | 9/2025 | Lanfranchi | G06F 16/213 |

* cited by examiner

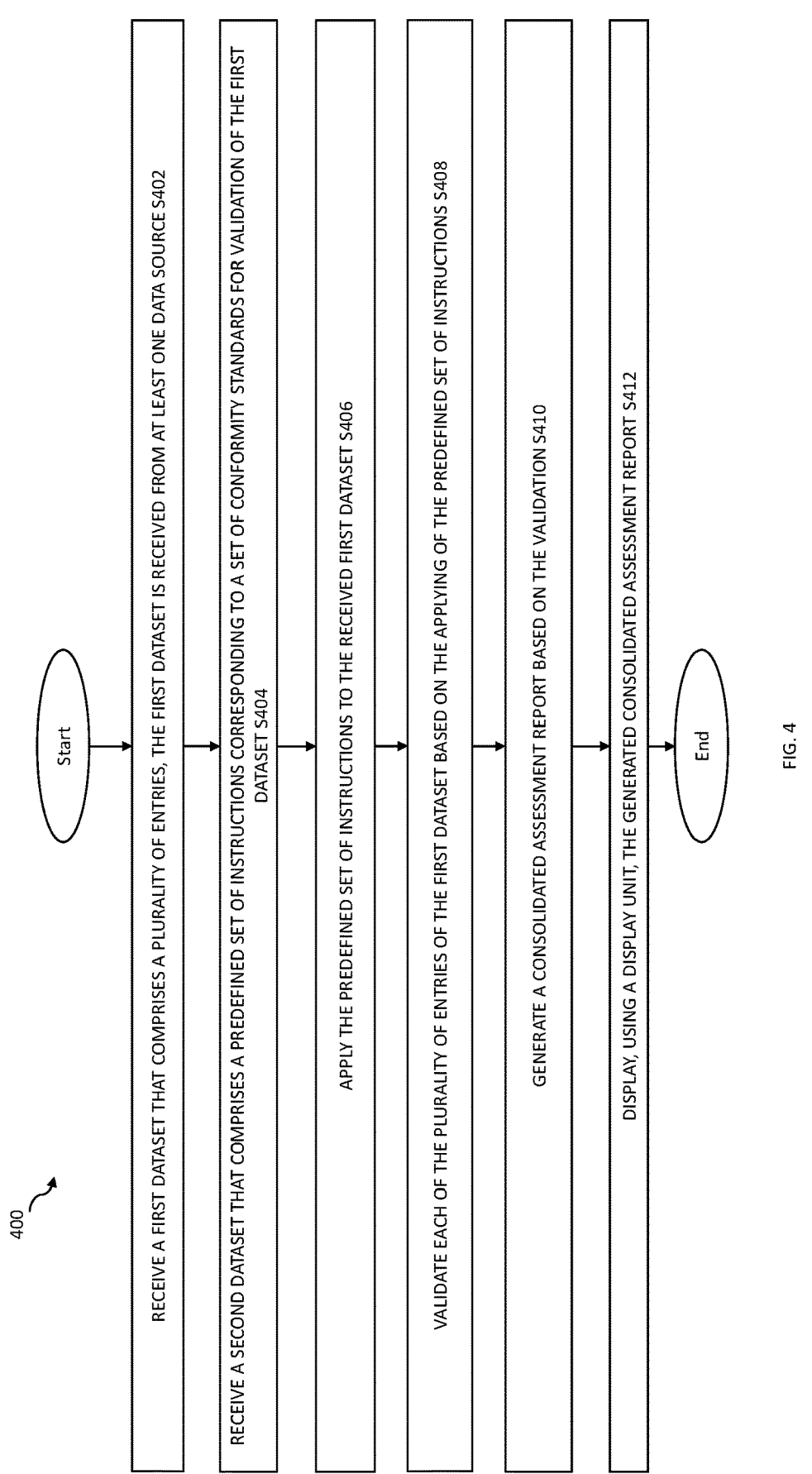

400

Start

RECEIVE A FIRST DATASET THAT COMPRISES A PLURALITY OF ENTRIES, THE FIRST DATASET IS RECEIVED FROM AT LEAST ONE DATA SOURCE S402

RECEIVE A SECOND DATASET THAT COMPRISES A PREDEFINED SET OF INSTRUCTIONS CORRESPONDING TO A SET OF CONFORMITY STANDARDS FOR VALIDATION OF THE FIRST DATASET S404

APPLY THE PREDEFINED SET OF INSTRUCTIONS TO THE RECEIVED FIRST DATASET S406

VALIDATE EACH OF THE PLURALITY OF ENTRIES OF THE FIRST DATASET BASED ON THE APPLYING OF THE PREDEFINED SET OF INSTRUCTIONS S408

GENERATE A CONSOLIDATED ASSESSMENT REPORT BASED ON THE VALIDATION S410

DISPLAY, USING A DISPLAY UNIT, THE GENERATED CONSOLIDATED ASSESSMENT REPORT S412

End

FIG. 4

METHOD AND SYSTEM FOR PERFORMING AUTOMATIC SCHEMA-BASED DATA VALIDATION

CROSS-REFERENCE TO RELATED APPLICATIONS

This application claims priority benefit from Indian Application No. 202311085480, filed Dec. 14, 2023 in the India Patent Office, which is hereby incorporated by reference in its entirety.

FIELD OF THE DISCLOSURE

The technology generally relates to data validation and conformance. Moreover, the present disclosure relates to automated frameworks designed for validating the integrity and conformance of data files against a predefined schema.

BACKGROUND INFORMATION

The following description of the related art is intended to provide background information pertaining to the field of the disclosure. This section may include certain aspects of the art that may be related to various features of the present disclosure. However, it should be appreciated that this section is used only to enhance the understanding of the reader with respect to the present disclosure, and not as an admission of the prior art.

Data ingestion and processing in business operations mostly depend on the use of files that conform to specific data standards or schemas. Various sources, such as upstream data feeds, upstream processes, and manual inputs, contribute to the files. Failure to adhere to the set of conformity standards leads to numerous complications, including process halts and the tedious task of identifying root causes, especially when the files contain a large number of records. Manually investigating such issues is often not feasible.

The existing technological solutions often involve the creation of custom validation logic. Such code may be crafted according to the rules defining the data standards. This approach has several limitations. Each change in the data schema requires corresponding updates in the custom code, increasing maintenance overhead. The custom code is usually platform-specific, resulting in dependency on the underlying technology. Code duplication occurs, as each application component dealing with file ingestion must incorporate similar validation logic.

Hence, in view of these and other existing limitations, there arises an imperative need to provide an efficient solution to overcome the above-mentioned limitations and to provide a method and system for performing automatic schema-based data validation.

SUMMARY

The present disclosure, through one or more of its various aspects, embodiments, and/or specific features or sub-components, provides, inter alia, various systems, servers, devices, methods, media, programs, and platforms for schema-driven data validation assessment.

According to an aspect of the present disclosure, a method for performing automatic schema-based data validation is disclosed. The method is implemented by at least one processor. The method includes receiving, by the at least one processor, a first dataset that comprises a plurality of entries, the first dataset is received from at least one data source. Next, the method includes receiving, by the at least one processor, a first dataset that comprises a plurality of entries, the first dataset is received from at least one data source. Next, the method includes applying, by the at least one processor, the predefined set of instructions to the received first dataset. Next, the method includes validating, by the at least one processor, each of the plurality of entries of the first dataset based on the applying of the predefined set of instructions. Next, the method includes generating, by the at least one processor, a consolidated assessment report based on the validation. Thereafter, the method includes displaying, by the at least one processor using a display unit, the generated consolidated assessment report.

In accordance with an exemplary embodiment, the first dataset is received in at least one of a comma separated values (CSV) format, and a spreadsheet editor format (i.e. with extensions .xls, or .xlsx).

In accordance with an exemplary embodiment, the validation of the plurality of entries further comprises analyzing a delimiter type, a structure of the header record, and a structure of a trailer record in the first dataset.

In accordance with an exemplary embodiment, the received first dataset corresponds to a data file having a plurality of rows and columns, and wherein the validation of the data file is performed at least in one of two levels, wherein: a first level of the two levels corresponds to validation of the complete data file at a time; and a second level of the two levels corresponds to validation of each of the plurality of rows and columns in a sequential manner.

In accordance with an exemplary embodiment, the method further comprises: parsing, by the at least one processor, the plurality of rows and columns into a plurality of segments, wherein each segment of the plurality of segments comprises at least one row and at least one column; and parallelly-validating, by the at least one processor, the parsed plurality of segments.

In accordance with an exemplary embodiment, the predefined set of instructions is received in a JavaScript Object Notation (JSON) format.

In accordance with an exemplary embodiment, the set of conformity standards is dynamically configurable based on a user input.

In accordance with an exemplary embodiment, the set of conformity standards comprises at least one of a data type check, a data range check, a date range check, and a pattern check.

In accordance with an exemplary embodiment, the method further comprises storing, by the at least one processor, the generated consolidated assessment report in a database for historical auditing purposes.

According to another aspect of the present disclosure, a computing device configured to implement an execution of a method for performing automatic schema-based data validation is disclosed. The computing device includes a processor; a memory; and a communication interface coupled to each of the processor and the memory. The processor may be configured to receive a first dataset that comprises a plurality of entries, the first dataset is received from at least one data source. Next, the processor may be configured to receive a second dataset that comprises a predefined set of instructions corresponding to a set of conformity standards for validation of the first dataset. Next, the processor may be configured to apply the predefined set of instructions to the received first dataset. Next, the processor may be configured to validate each of the plurality of entries of the first dataset based on the application of the predefined set of instructions. Next, the processor may be configured to generate a consolidated assessment report based on the validation. Thereafter, the processor may be configured to display, using a display unit, the generated consolidated assessment report.

In accordance with an exemplary embodiment, the first dataset is received in at least one of a CSV format, and a spreadsheet editor format (i.e. with extensions .xls, or .xlsx).

In accordance with an exemplary embodiment, to validate the plurality of entries, the processor is further configured to analyze a delimiter type, a structure of the header record, and a structure of a trailer record in the first dataset.

In accordance with an exemplary embodiment, the received first dataset corresponds to a data file having a plurality of rows and columns, and wherein the validation of the data file is performed at least in one of two levels, wherein: a first level of the two levels corresponds to validation of the complete data file at a time; and a second level of the two levels corresponds to validation of each of the plurality of rows and columns in a sequential manner.

In accordance with an exemplary embodiment, the processor is further configured to: parse the plurality of rows and columns into a plurality of segments, wherein each segment of the plurality of segments comprises at least one row and at least one column; and parallelly-validate the parsed plurality of segments.

In accordance with an exemplary embodiment, the predefined set of instructions are received in a JSON format.

In accordance with an exemplary embodiment, the set of conformity standards is dynamically configurable based on a user input.

In accordance with an exemplary embodiment, the set of conformity standards comprises at least one of a data type check, a data range check, a date range check, and a pattern check.

In accordance with an exemplary embodiment, the processor is further configured to store the generated consolidated assessment report in a database for historical auditing purposes.

According to yet another aspect of the present disclosure, a non-transitory computer-readable storage medium storing instructions for performing automatic schema-based data validation is disclosed. The instructions include executable code which, when executed by a processor, may cause the processor to receive a first dataset that comprises a plurality of entries, the first dataset is received from at least one data source; receive a second dataset that comprises a predefined set of instructions corresponding to a set of conformity standards for validation of the first dataset; apply the predefined set of instructions to the received first dataset; validate each of the plurality of entries of the first dataset based on the application of the predefined set of instructions; generate a consolidated assessment report based on the validation; and display, using a display unit, the generated consolidated assessment report.

In accordance with an exemplary embodiment, the first dataset is received in at least one of a CSV format, and a spreadsheet editor format (i.e. with extensions .xls, or .xlsx).

In accordance with an exemplary embodiment, to validate the plurality of entries, the executable code when executed causes the processor to analyze a delimiter type, a structure of the header record, and a structure of a trailer record in the first dataset.

In accordance with an exemplary embodiment, the received first dataset corresponds to a data file having a plurality of rows and columns, and wherein the validation of the data file is performed at least in one of two levels, wherein: a first level of the two levels corresponds to validation of the complete data file at a time; and a second level of the two levels corresponds to validation of each of the plurality of rows and columns in a sequential manner.

In accordance with an exemplary embodiment, the executable code when executed causes the processor to: parse the plurality of rows and columns into a plurality of segments, wherein each segment of the plurality of segments comprises at least one row and at least one column; and parallelly-validate the parsed plurality of segments.

In accordance with an exemplary embodiment, the predefined set of instructions are received in a JSON format.

In accordance with an exemplary embodiment, the set of conformity standards is dynamically configurable based on a user input.

In accordance with an exemplary embodiment, the set of conformity standards comprises at least one of a data type check, a data range check, a date range check, and a pattern check.

In accordance with an exemplary embodiment, the executable code when executed causes the processor to store the generated consolidated assessment report in a database for historical auditing purposes.

BRIEF DESCRIPTION OF THE DRAWINGS

The present disclosure is further described in the detailed description which follows, in reference to the noted plurality of drawings, by way of non-limiting examples of exemplary embodiments of the present disclosure, in which like characters represent like elements throughout the several views of the drawings.

FIG. 4 illustrates an exemplary method flow diagram for performing automatic schema-based data validation in accordance with an exemplary embodiment.

DETAILED DESCRIPTION

Figure 1:
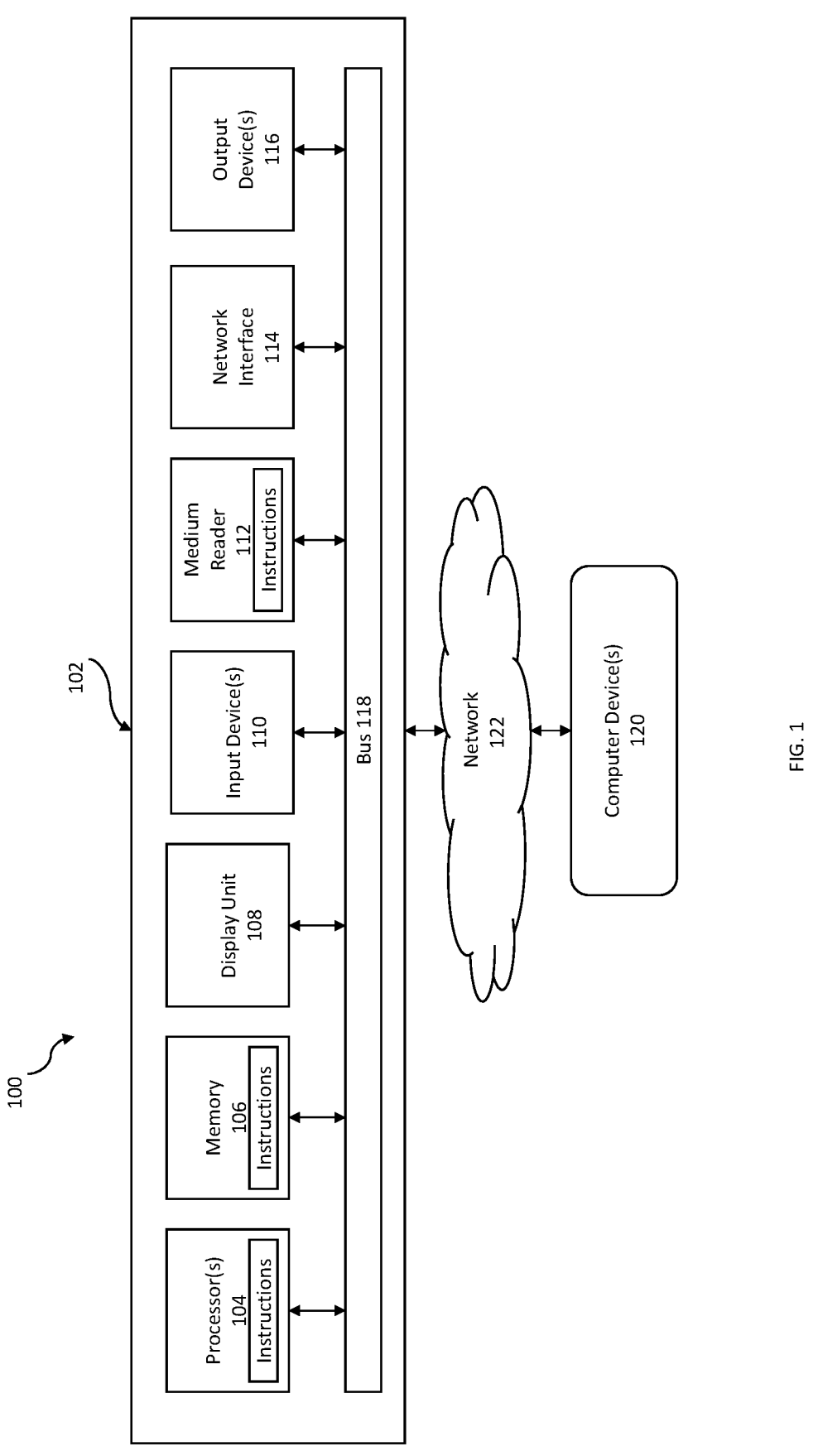
FIG. 1 illustrates an exemplary computer system for performing automatic schema-based data validation in accordance with an exemplary embodiment.

Exemplary embodiments now will be described with reference to the accompanying drawings. The invention may, however, be embodied in many different forms and should not be construed as limited to the embodiments set forth herein; rather, these embodiments are provided so that this invention will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "include", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations and arrangements of one or more of the associated listed items. Also, as used herein, the phrase "at least one" means and includes "one or more" and such phrases or terms can be used interchangeably.

Unless otherwise defined, all terms (including technical and scientific terms) used herein have the same meaning as commonly understood by one of ordinary skill in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The figures depict a simplified structure only showing some elements and functional entities, all being logical units whose implementation may differ from what is shown. The connections shown are logical connections and the actual physical connections may be different.

In addition, all logical units and/or controllers described and depicted in the figures include the software and/or hardware components required for the unit to function. Further, each unit may comprise within itself one or more components, which are implicitly understood. These components may be operatively coupled to each other and be configured to communicate with each other to perform the function of the said unit.

In the following description, for the purposes of explanation, numerous specific details have been set forth in order to provide a description of the disclosure. It will be apparent, however, that the invention may be practiced without these specific details and features.

Through one or more of its various aspects, embodiments and/or specific features or sub-components of the present disclosure, are intended to bring out one or more of the advantages as specifically described above and noted below.

The examples may also be embodied as one or more non-transitory computer-readable medium having instructions stored thereon for one or more aspects of the present technology as described and illustrated by way of the examples herein. The instructions in some examples include executable code that, when executed by one or more processors, causes the processors to carry out steps necessary to implement the methods of the examples of this technology that are described and illustrated herein.

To overcome the problems associated with the validation of large-scale data files and reporting, the present disclosure provides a method and system for performing automatic schema-based data validation. One of the primary issues in traditional approaches is the lack of standardization. Without a uniform set of rules, validation can be inconsistent, which compromises the quality of the data. The present system addresses such a problem by introducing a predefined set of instructions that serve as conformity standards for validating a first dataset thereby ensuring that data from different sources can be assessed and validated in a uniform and reliable manner. Another common problem is the limitation in data format support. Traditional systems often require data and validation rules to be in specific formats, which can be restrictive. The present system is designed to be flexible, supporting multiple formats for both the data to be validated and the validation rules, thereby making the system adaptable and allowing working seamlessly across different data ecosystems.

Previous systems also often suffered from inflexibility when it comes to modifying or updating validation rules. Any changes usually required substantial coding effort and potentially led to downtime. The present system allows for dynamic configuration of conformity standards by the user, making it easy to adapt to new data structures or business requirements without extensive code modifications or system interruptions. Debugging and troubleshooting are often difficult in traditional systems because of the lack of detailed logs for non-conforming entries. The system improves the debugging process by logging detailed event information for each entry that fails to meet the conformity standards. The detailed logging facilitates pinpointing the exact issue, making it easier to correct and ensuring that the same problem doesn't recur. Operating system dependency is another issue that often complicates the deployment of traditional validation systems. The system is designed to be operating system-agnostic, enabling it to run on a variety of platforms without modification, thereby broadening applicability and making it easier to integrate into existing infrastructures.

In many older systems, data validation checks are often superficial or incomplete. The current system incorporates a comprehensive range of checks, including data type, range, date range, and pattern checks, making it more robust and reliable, thus reducing the likelihood of erroneous data passing through and enhancing overall data integrity. The lack of auditing capabilities is a significant drawback in many prior systems. The system generates a consolidated assessment report that is stored in a database, enabling historical auditing. Moreover, the system introduces an additional layer of pre-validation checks. Before validating individual data entries, the system checks the conformance of the entire dataset. Further, the system even validates the structure of the second dataset containing the validation rules.

It would be appreciated by the person skilled in the art that the present system addresses a wide range of issues commonly found in the prior art, offering a more flexible, reliable, and comprehensive solution for data stream validation and assessment.

In an example, a user works for a healthcare organization that receives patient data from various hospitals. Each hospital has its own way of formatting data, and the user's job is to ensure that all incoming data meet certain quality standards before being integrated into a centralized database. In the old system, user had to manually check each entry against a variety of conditional rules, leading to inconsistencies. The new system has a predefined set of standards that automatically apply to all data streams, regardless of the originating hospital. As a result, all data get assessed uniformly. Some hospitals send data in one of (CSV, XLS, XLSX, Fixed with text file. Earlier, each format needed a separate validation process. Now, the system can handle multiple formats, simplifying the validation workflow. Earlier, if a new type of data field was introduced, like a new medical test, user had to consult IT to change the validation logic. Now, user can dynamically configure new validation rules, ensuring that the system can quickly adapt to changes. In the past, if an entry failed validation, it was often a time-consuming task to identify the problem. The new system logs specific details about what went wrong with each non-conforming entry, helping user to quickly resolve the issue. The old validation tool was built for Windows. A few hospitals using Unix systems had to employ a workaround.

Previously, the tool only checked for data type conformity. The present system also checks for ranges, patterns, and date validity, making the validation process far more robust. Before, there was no easy way to review past validations. The system saves a consolidated assessment report of each validation, aiding in compliance and auditing efforts. The new system not only checks each data entry but also validates the overall conformity of the entire file before validating individual entries. The system also checks the integrity of the predefined set of standards itself, ensuring no faulty rules lead to incorrect validation. By addressing these problems of the existing systems, the present system significantly streamlines the data validation process, making it more reliable, flexible, and user-friendly.

FIG. 1 is an exemplary system for use in accordance with the embodiments described herein. The system 100 is generally shown and may include a computer system 102 which is generally indicated. The term "computer system" may also be referred to as "computing device" and such phrases/terms can be used interchangeably in the specifications.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud-based environment. Even further, the instructions may be operative in such cloud-based computing environment.

In a networked deployment, the computer system 102 may operate in the capacity of a server or as a client-user computer in a server-client user network environment, a client-user computer in a cloud-based computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smartphone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The Processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. Processor 104 is an article of manufacture and/or a machine component. The processor 104 is configured to execute software instructions in order to perform functions as described in the various embodiments herein. The processor 104 may be a general-purpose processor or may be part of an application-specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories, as described herein, may be random access memory (RAM), read-only memory (ROM), flash memory, electrically programmable read-only memory (EPROM), electrically erasable programmable read-only memory (EEPROM), registers, a hard disk, a cache, a removable disk, tape, compact disk read-only memory (CD-ROM), digital versatile disk (DVD), floppy disk, Blu-ray disk, or any other form of storage medium known in the art. Memories may be volatile or non-volatile, secure and/or encrypted, unsecure and/or unencrypted. As regards the present disclosure, the computer memory 106 may comprise any combination of memories or a single storage.

The computer system 102 may further include a Display Unit 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 104 during execution by the computer system 102.

Furthermore, the computer system 102 may include any additional devices, components, parts, peripherals, hardware, software, or any combination thereof which are commonly known and understood as being included with or within a computer system, such as but not limited to, a network interface 114 and an output device 116. The output device 116 may include but is not limited to, a speaker, an audio out, a video out, a remote-controlled output, a printer, or any combination thereof. Additionally, the term "Network interface" may also be referred to as "Communication interface" and such phrases/terms can be used interchangeably in the specifications.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect expresses, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near-field communication, ultra-band, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for performing automatic schema-based data validation.

Figure 2:
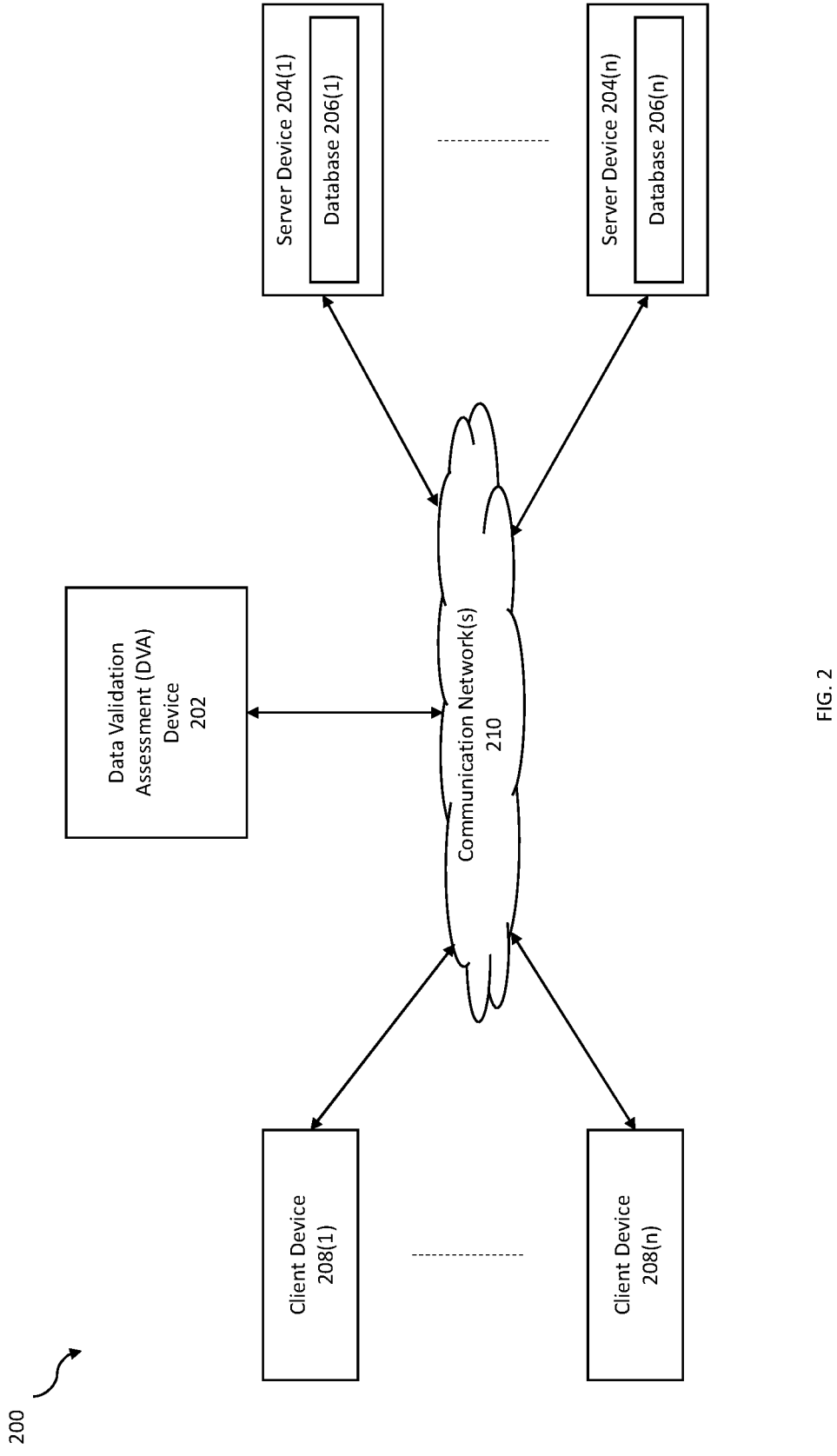
FIG. 2 illustrates an exemplary diagram of a network environment for performing automatic schema-based data validation in accordance with an exemplary embodiment.

Referring to FIG. 2, a schematic of an exemplary network environment 200 for implementing a method for performing automatic schema-based data validation is illustrated. In an exemplary embodiment, the method is executable on any networked computer platform, such as, for example, a personal computer (PC).

The method for performing automatic schema-based data validation may be implemented by a Data Validation Assessment (DVA) device 202. The DVA device 202 may be the same or similar to the computer system 102 as described with respect to FIG. 1. The DVA device 202 may store one or more applications that can include executable instructions that, when executed by the DVA device 202, cause the DVA device 202 to perform desired actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

In a non-limiting example, the application(s) may be operative in a cloud-based computing environment. The application(s) may be executed within or as a virtual machine(s) or virtual server(s) that may be managed in a cloud-based computing environment. Also, the application(s), and even the DVA device 202 itself, may be located in the virtual server(s) running in a cloud-based computing environment rather than being tied to one or more specific physical network computing devices. Also, the application(s) may be running in one or more virtual machines (VMs) executing on the DVA device 202. Additionally, in one or more embodiments of this technology, virtual machine(s) running on the DVA device 202 may be managed or supervised by a hypervisor.

In the network environment 200 of FIG. 2, the DVA device 202 is coupled to a plurality of server devices 204(1)-204(n) that hosts a plurality of databases 206(1)-206(n), and also to a plurality of client devices 208(1)-208(n)

via communication network(s) 210. A communication interface of the DVA device 202, such as the network interface 114 of the computer system 102 of FIG. 1, operatively couples and communicates between the DVA device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DVA device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides several advantages including methods, non-transitory computer-readable media, and DVA devices that efficiently implement the method for automatic schema-driven data validation assessment.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Networks (PSTNs), Ethernet-based Packet Data Networks (PDNs), combinations thereof, and the like.

The DVA device 202 may be a standalone device or integrated with one or more other devices or apparatuses, such as one or more of the server devices 204(1)-204(n), for example. In one particular example, the DVA device 202 may include or be hosted by one of the server devices 204(1)-204(n), and other arrangements are also possible. Moreover, one or more of the devices of the DVA device 202 may be in a same or a different communication network including one or more public, private, or cloud-based networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. In an example, the server devices 204(1)-204(n) may process requests received from the DVA device 202 via the communication network(s) 210 according to the hypertext transfer protocol (HTTP)-based and/or JSON protocol, for example, although other protocols may also be used.

The server devices 204(1)-204(n) may be hardware or software or may represent a system with multiple servers in a pool, which may include internal or external networks. The server devices 204(1)-204(n) hosts the databases or repositories 206(1)-206(n) that are configured to store data related to, the first dataset, the second dataset, the generated consolidated assessment report.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a controller/agent approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to-peer architecture, virtual machines, or within a cloud-based architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the DVA device 202 via communication network(s) 210. Accordingly, the client devices 208(1)-208(n) may be mobile computing devices, desktop computing devices, laptop computing devices, tablet computing devices, or the like, that host chat, e-mail, or voice-to-text applications, for example. In an exemplary embodiment, at least one client device 208 is a wireless mobile communication device, e.g., a smartphone.

The client devices 208(1)-208(n) may run interface applications, such as standard web browsers or standalone client applications, which may provide an interface to communicate with the DVA device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the DVA device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DVA device 202, the server devices 204(1)-204(n), or the client devices 208(1)-208(n), for example, may be configured to operate as virtual instances on the same physical machine. In other words, one or more of the DVA device 202, the server devices 204(1)-204(n), or the client devices 208(1)-208(n) may operate on the same physical device rather than as separate devices communicating through communication network(s) 210. Additionally, there may be more or fewer DVA devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
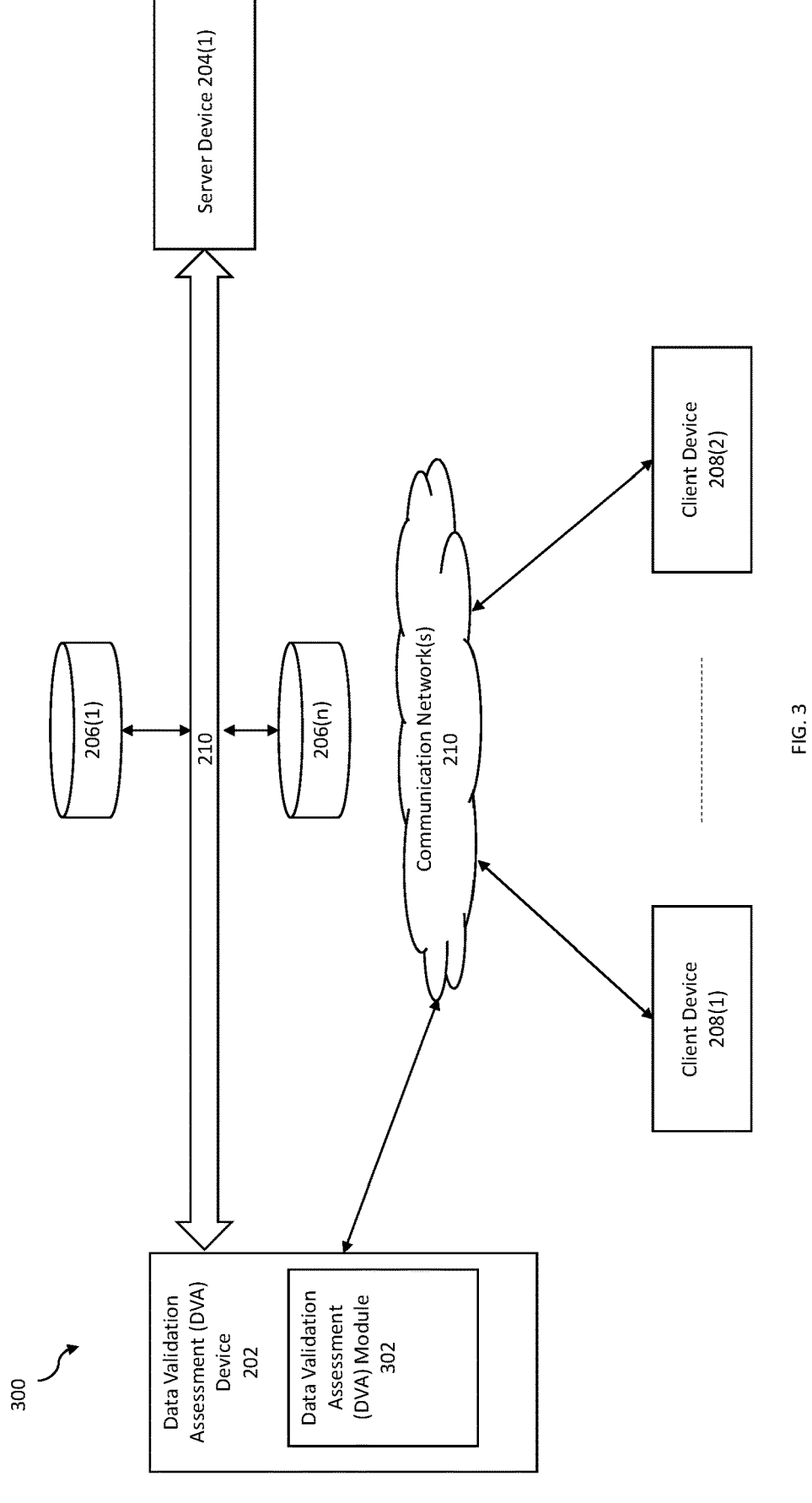
FIG. 3 illustrates an exemplary system for performing automatic schema-based data validation in accordance with an exemplary embodiment.

FIG. 3 illustrates an exemplary system for implementing a method for performing automatic schema-based data validation in accordance with an exemplary embodiment. As illustrated in FIG. 3, according to exemplary embodiments, the system 300 may comprise an DVA device 202 including a Data Validation Assessment (DVA) module 302 that may be connected to a server device 204(1) and one or more repository from the repositories 206(1) . . . 206(n) via a communication network 210, but the disclosure is not limited thereto.

The DVA device 202 is described and shown in FIG. 3 as including the DVA module 302, although it may include other rules, policies, modules, databases, or applications, for example. As will be described below, the DVA module 302 is configured to implement a method for performing automatic schema-based data validation.

An exemplary system 300 for implementing a mechanism for performing automatic schema-based data validation by utilizing the network environment of FIG. 2 is shown as being executed in FIG. 3. Specifically, a first client device 208(1) and a second client device 208(2) are illustrated as being in communication with DVA device 202. In this regard, the first client device 208(1) and the second client device 208(2) may be "clients" of the DVA device 202 and are described herein as such. Nevertheless, it is to be known and understood that the first client device 208(1) and/or the second client device 208(2) need not necessarily be "clients" of the DVA device 202, or any entity described in association therewith herein. Any additional or alternative relationship may exist between either or both of the first client device 208(1) and the second client device 208(2) and the DVA device 202, or no relationship may exist.

Further, the DVA device 202 is illustrated as being able to access one or more repositories 206(1) . . . 206(n). The DVA module 302 may be configured to access these repositories/databases for implementing a method for performing automatic schema-based data validation.

The first client device 208(1) may be, for example, a smartphone. The first client device 208(1) may be any additional device described herein. The second client device 208(2) may be, for example, a personal computer (PC). The second client device 208(2) may also be any additional device described herein.

The process may be executed via the communication network(s) 210, which may comprise plural networks as described above. For example, in an exemplary embodiment, either or both the first client device 208(1) and the second client device 208(2) may communicate with the DVA device 202 via broadband or cellular communication. These embodiments are merely exemplary and are not limiting or exhaustive.

Referring to FIG. 4, an exemplary method 400 is shown for performing automatic schema-based data validation in accordance with an exemplary embodiment. As shown in FIG. 4, the method begins following a need validating the integrity and conformance of data files against a predefined schema.

At step S402, the method includes receiving, by the at least one processor 104, a first dataset that comprises a plurality of entries, the first dataset is received from at least one data source. The first dataset consists of the plurality of entries, or individual units of data, that may include, but not limited only to numerical values, text strings, date timestamps, to more complex types of data like JSON objects. The entries are collected from at least one data source, which could be a database, a file, an API, or even a stream of real-time data. The first dataset may be received in at least one of a CSV format, and a spreadsheet editor format (i.e. with extensions .xls, or .xlsx).

The at least one source may include, but not limited only to, a database file, a cloud data stream, or data related to an organization, a financial institution, an educational institute, an e-commerce platform, a healthcare facility, a government body, a manufacturing unit, or a media house.

At step S404, the method includes receiving, by the at least one processor 104, a second dataset that comprises a predefined set of instructions corresponding to a set of conformity standards for validation of the first dataset.

The predefined set of instructions can include, but are not limited only to, simple validation rules like checking if an email column only contains valid email addresses, more complex rules involving logical conditions, nested rules, or even machine-learning algorithms for outlier detection. The predefined set of instructions facilitates in establishing a level of quality or conformity that the data in the first dataset must meet. The set of conformity standards can be adapted such that to comply with industry-specific guidelines, company-specific internal standards, or any other set of requirements. The predefined set of instructions (such as schema) may be provided in a JSON format. The JSON format is a text-based format that allows for structuring of data such that both user and machines can understand. For example, when the instructions are received in the JSON format, they are organized in a manner that is easy to process, interpret, and implement.

The set of conformity standards can include a variety of formats to ensure data integrity and accuracy. Firstly, there are number formats, which can be represented as integers (int) or floating-point numbers (float). Next, there's the Boolean format (bool), which essentially captures true or false values. Date formats are also crucial, with several recognized structures such as yyyy/mm/dd, yyyymmdd, and dd-MMM-yyyy. Email data must conform to specific validation formats to be considered valid. Additionally, there's the enumeration of strings, which involves a defined list of acceptable string values. Lastly, plain strings are also part of the set of conformity standards, allowing for straightforward text without specific enumerations. The set of conformity standards may further include several checks that are performed to ensure data meets certain criteria. One such check is the data type check, which ensures that the data entered matches the expected type, such as an integer, string, or any other data type. Additionally, there's the data range check, which verifies that numerical data falls within a specified minimum and maximum range. Dates are also scrutinized through the date range check, making sure that they lie within a defined start and end date. Lastly, the pattern check ensures that data follows a particular format or sequence, such as validating that an email address has the correct structure.

The method for receiving the second dataset can differ based on the specific implementation of the system. In an embodiment, users could manually upload a configuration file containing the rules, or the system could fetch the rules dynamically from another system (such as third-party) via application programming interface (API) calls. In another embodiment, the predefined set of instructions could be pre-configured within the system itself or even dynamically generated based on statistical analysis or machine learning. In yet another embodiment, the set of conformity standards is not fixed or static and can be modified or adjusted according to the needs of a user. For example, if the user has specific requirements or preferences, they can input their desired parameters or criteria. Once the input is received, the conformity standards adapt and reconfigure themselves based on the provided information. It would be appreciated by the person skilled in the art that the dynamic configurability ensures that the system can address individualized needs, rather than forcing a one-size-fits-all standard.

In an example, a university's registration system where students can sign up for various courses each semester. The system receives student enrollment data in a CSV file format (the first dataset), containing various fields such as Student ID, Course ID, and Enrollment Date. The integrity and quality of the enrollment data are crucial for the university's operation, from scheduling classes to assigning instructors. The second dataset would be a predefined set of instructions, or a schema, which would contain the rules that the enrollment data needs to follow. The set of instructions might specify such as: Student ID must be a nine-digit integer, Course ID must match a valid ID in the course catalog, and Enrollment Date must be in "YYYY-MM-DD" format and within the enrollment period. So, when a new batch of enrollment data comes in as a CSV file, the system would refer to the second dataset, the predefined schema, to check the quality and integrity of the incoming data.

In an exemplary embodiment, the processor 104 As the procedure continues, there's an additional step involved. This step focuses on examining the set of second data to identify any mistakes or discrepancies. This ensures the accuracy and integrity of the data, making certain that it's reliable and free from any issues that could affect its subsequent use or interpretation. Upon the identification of errors, the system is equipped with mechanisms to report these inconsistencies. Users or other components within the system are informed, which could be via on-screen alerts, logs, or other notification systems. In another exemplary embodiment, there might be provisions in place for automatic rectification of detected errors. In cases where automation isn't feasible, users might be equipped with tools to intervene and make the necessary corrections manually.

In an example, a company's application that uses Processor 104 to manage customer information. When the application receives a list of customer details, like names, phone numbers, and email addresses, it also gets a set of rules to verify this information. Before checking each detail, Processor 104 first reviews these rules. If there's a mistake in the rules, like stating an email shouldn't have an "@" symbol, Processor 104 detects this error and sends an alert, likely to the application's dashboard. This checking ensures only correct rules are used, maintaining the accuracy of the customer database.

At step S406, the method includes applying, by the at least one processor 104, the predefined set of instructions to the received first dataset.

The method generally initiates a loop that iterates over each entry of the plurality of entries of the first dataset. An "entry" may correspond to a single row or a single column of data that includes multiple fields. Each field within the entry may be checked against the relevant criteria outlined in the predefined set of instructions.

For example, if one of the instructions dictates that a "Date of Birth" field must contain a valid date in the format "MM/DD/YYYY," the method will actively compare the value in the "Date of Birth" field for each entry against the criteria. If an entry is found with a date in the "DD/MM/YYYY" format, that particular entry will be flagged as non-conforming.

Various types of checks could be implemented based on the requirement:

Type Checks: Verifying if the data is of the correct type (e.g., string, integer, Boolean).

Range Checks: Confirming that numerical values fall within a specified range.

Enum Checks: Checking if the data belongs to a specific set of allowable values.

Pattern Checks: Verifying if the data follows a specific regex pattern, like an email structure.

Relational Checks: Checking if the data maintains certain relationships, like a 'Child's age' field being less than a 'Parent's age' field.

In an example, a school collects data from students at the beginning of the academic year. The data might include names, dates of birth, addresses, and subjects the students have enrolled in. The collected data, which we'll call our "first dataset," is received from various sources: handwritten forms, online submissions, and previous year's records. The school has a specific way they like to format and organize the data such as "the predefined set of instructions". For instance: 1. Names should be in the format "Last Name, First Name.". 2. Dates of birth should be in the format "DD/MM/YYYY.". 3. Addresses should have no abbreviations (e.g., "Street" instead of "St."). 4. Subjects should be listed alphabetically. The at least one processor 104 may receive the first dataset and the predefined set of instructions and check conformity of each of the entries of the first data based on the predefined set of instructions corresponding to the set of conformity standards.

At step S408, the method includes validating, by the at least one processor 104, each of the plurality of entries of the first dataset based on the applying of the predefined set of instructions.

Based on applying the predefined set of instructions to the received first dataset, if it is found that a specific entry or entries do not conform to the set of conformity standards for validation, that particular entry or entries may be flagged for further action. In an embodiment, the flagged entry or entries could involve logging the error for manual review. In another embodiment, the flagged entry or entries could involve auto-correcting the entry. For example, if the conformity standards required that a "Salary" field must be a positive integer and a certain entry has a negative value for the field, that entry would be flagged as non-conforming. Similarly, if there was a conformity standard specifying that an "Email Address" field must follow a specific pattern (like containing an "@" symbol followed by a domain), an entry lacking such specific pattern would be considered non-conforming.

It would be appreciated by the person skilled in the art that the idea here is not just to find non-conforming entries but to understand the specific ways in which they are non-conforming. Understanding the 'why' and 'how' of non-conformance is crucial for troubleshooting and data quality improvement.

The step of validation may further include analyzing a delimiter type, a structure of the header record, and a structure of a trailer record in the first dataset. A delimiter corresponds to a boundary marker that indicates where one piece of data ends and the next begins. The processor 104 may first identify what kind of delimiter is used in the first dataset to separate different pieces of information. A header corresponds to a title that indicates what kind of information is present in each column. For example, in a table about people, the header might have columns like "Name", "Age", "Address", etc. The processor 104 may check the structure of the header to determine the type of data comprising in the first dataset. A trailer record corresponds to an end of a data file and can include summary information, like the total number of records in the dataset. The processor 104 also checks the format or structure of the trailer record.

In an example, a dataset that is structured like a spreadsheet used by a bookstore to keep track of book sales. The dataset is in a CSV file, which the processor 104 is configured to validate. The delimiter in the CSV file is a comma (','). Thus, each time the processor 104 comes across a comma, the processor 104 may consider that one piece of information has ended, and another is starting. In an example, the list might look like: "'The Hobbit, J.R.R. Tolkien, 15, 2023 Apr. 1'". Each comma separates the book title, author, quantity sold, and date of sale. At the very top of the CSV file, the first line is the header, which might read: "'Book Title, Author, Quantity Sold, Date of Sale'". The header helps the processor 104 determine that every entry below will follow the order-first the title, then the author, followed by the quantity sold, and finally the date. At the end of the CSV file, there might be a trailer that sums up the total number of books sold that day, like: "'Total Books Sold, 150'". The processor 104 checks the trailer to confirm that the entry is formatted correctly and possibly to verify that the sum of the 'Quantity Sold' from all entries matches the total. The processor 104, if finds an entry: "'Hamlet; William Shakespeare 10; 2023 Apr. 1'". The processor 104 would flag the entry as incorrect because of use of semicolons instead of commas, violating the delimiter type standard. Similarly, if the header was out of order or if the trailer did not sum the day's sales correctly, the processor 104 would also flag as issues based on its analysis of the header and trailer structures.

In an exemplary embodiment, the received first dataset corresponds to a data file having a plurality of rows and columns (for example, a spreadsheet, with multiple rows and columns, such as, but not limited to, a Microsoft Excel file). The validation of the data file is performed at least in one of two levels, wherein: a first level of the two levels corresponds to validation of the complete data file at a time; and a second level of the two levels corresponds to validation of each of the plurality of rows and columns in a sequential manner.

In an example, an e-commerce company generates a data file that lists all the items sold, the quantity, the buyer's details, the price, and other related information. The file has many rows (each representing a sale) and columns (each representing details like product name, buyer name, price, etc.). Now, the processor 104 in their system is tasked with checking the data file for any issues. The processor 104 quickly scans the entire sales data file to check if the file is in the correct format, if the data file has the expected number of columns, or if there are any glaring issues like missing large chunks of data. For instance, if the file is supposed to have data on 1,000 sales but only has 10. After the initial check, processor 104 dives deeper and goes through each sale (row by row) and each detail (column by column). For example, it'll check: Is the product name valid? (E.g., if e-commerce doesn't sell "cars," then a sale with "car" would be flagged.). Is the price in the right format and range? (E.g., A price of "$–50" or "five dollars" would be flagged.). the buyer's details complete and in the correct format?.

At step S410, the method includes generating, by the at least one processor 104, a consolidated assessment report based on the validation of each of the plurality of entries of the first dataset.

The step of validating, each of the plurality of entries of the first dataset facilitates in achieving data quality assurance. Each entry of the plurality of entries is checked to find entries that do not meet the set of conformity standards. Each entry is checked for a series of checks, and the checks produce outcomes that indicate whether an entry has passed or failed to meet each specific standard. The method consolidates all such non-conforming entries for further examination or action. Depending on how the system is configured, the non-conforming entries could be isolated in a separate dataset, marked in the existing dataset with a flag indicating non-conformance, or logged in the consolidated assessment report.

The consolidated assessment report may include an overview section that provides summary statistics that could include the total number of entries examined, the number of entries that were found to be conforming to the set of conformity standards for validation, and those that were not. The consolidated assessment report may further provide percentages or ratios of conforming and non-conforming entries of the plurality of entries to give a quick snapshot of data quality.

In addition to summary statistics, the consolidated assessment report may be detailed. For each entry of the first dataset, the consolidated assessment report may indicate whether an entry or entries of the first dataset conforms to the predefined standards or not. If an entry does not conform, the consolidated assessment report will specify which rules were violated. For example, the consolidated assessment report might include a section that lists out all the non-conforming entries along with the specific standards they failed to meet. The consolidated assessment report could be organized in a tabular form where each row represents an entry, and the columns could include fields like "Entry ID," "Failed Checks," and "Reason for Non-Conformance."

Moreover, the consolidated assessment report could also incorporate visual elements like graphs or charts that make it easier to interpret the data. For example, a pie chart could show the proportion of conforming to non-conforming entries, or a bar graph could display the number of entries that failed each specific type of check. The consolidated assessment report may also include recommendations or action items. If a certain percentage of entries fail due to a particular reason, the consolidated assessment report might suggest prioritizing data correction. In an embodiment, the consolidated assessment report is usually generated in a format that is easily shareable and interpretable by both technical and non-technical users that may be downloadable as a portable document format (PDF) or could be presented as a dashboard in a user interface.

Depending on the system's configuration, the consolidated assessment report might be generated summarizing the validation results, showing which entries were non-conforming and detailing why they failed to meet the standards. It would be appreciated by the person skilled in the art that the validation step ensures a high level of data integrity and reliability, making sure that downstream processes and analyses are based on clean, well-structured data.

At step S412, the method includes generating, by the at least one processor 104, a consolidated assessment report based on the validation.

A graphical user interface (GUI) of the display unit often takes the form of an interactive dashboard, a significant evolution from a mere static report. The dashboard would usually feature multiple elements designed to convey a broad spectrum of information clearly and intuitively.

In addition to the summary, a more detailed overview of the data may be displayed on the display unit. The display can be in the form of a table or list that displays each entry along with indicators—such as color-coding or icons—that specify whether or not the entry or entries of the table or list meets the set of conformity standards. Moreover, the UI can include a section dedicated to recommended actions or next steps. Based on the validation results, the user can be provided with an option to perform cleanup or if the first dataset is ready for further processing or analysis. Advanced features could also allow users to search or filter the displayed results based on certain criteria, offering more targeted insights into the dataset. In some advanced implementations, real-time updates could be included to allow instantaneous display of newly processed and evaluated entries.

The method may further include, parsing, by the at least one processor 104, the plurality of rows and columns into a plurality of segments, wherein each segment of the plurality of segments comprises at least one row and at least one column; and parallelly-validating, by the at least one processor 104, the parsed plurality of segments.

The processor first "parse" the data i.e. the data file, which is made up of rows and columns, and breaks down into smaller chunks or "segments". Each of the segments would still have the structure of the original data such as rows and columns. For example, a big table of data and dividing into smaller tables, where each of the smaller tables (or segments) has at least one row and one column. After breaking down the data into the smaller segments, the processor 104 then checks or "validates" each segment. What's special here is that the validation for the parsed plurality of segments "parallelly". This means instead of checking one segment, then moving on to the next, and so on, the processor 104 checks multiple segments at the same time.

For example, while processing a big spreadsheet. Instead of checking each cell one by one, first break the spreadsheet into smaller sections. Then, instead of checking each small section one after the other, you check multiple small sections simultaneously or parallelly. It would be appreciated by the person skilled in the art that by adopting parallel validation, the time required to validate the entire dataset is drastically reduced.

Figure 5:
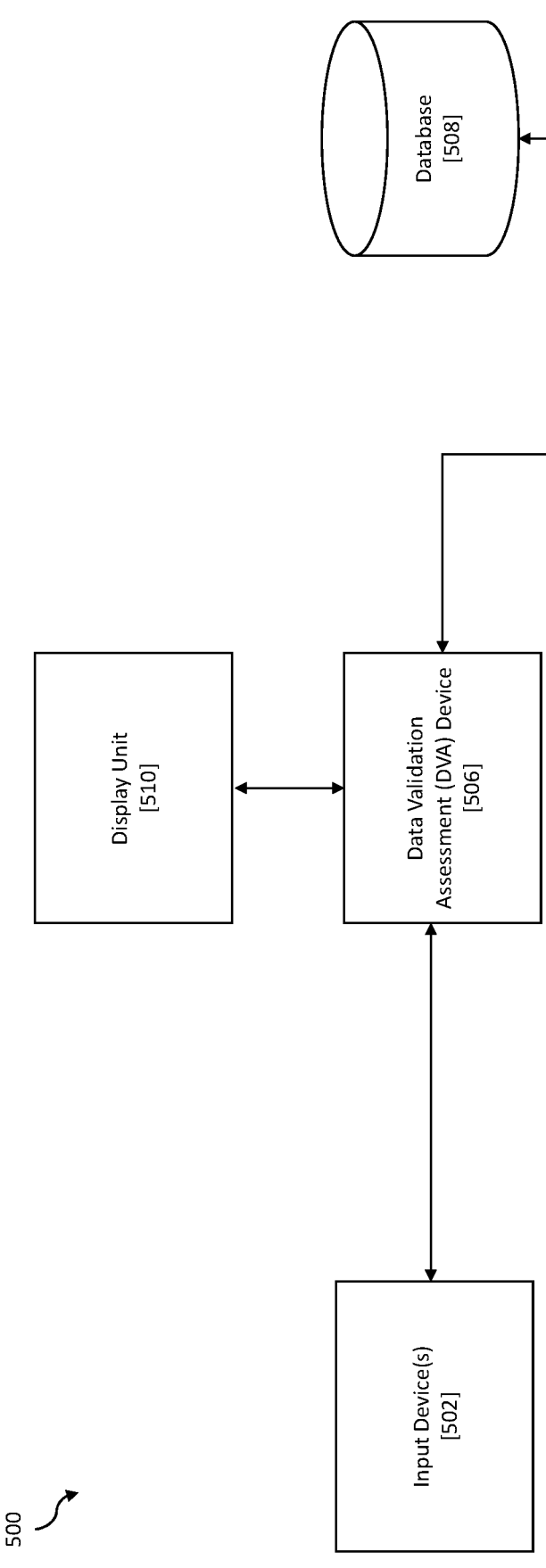
FIG. 5 illustrates a process flow diagram usable for performing automatic schema-based data validation in accordance with an exemplary embodiment.

FIG. 5 illustrates a process flow diagram usable for implementing a method for providing automatic schema-based data validation assessment, in accordance with an exemplary embodiment. As illustrated in FIG. 5, the process flow 500 begins with receiving by data validation assessment (DVA) device 506 a first dataset that comprises a plurality of entries from the at least one data source. The first data could be from databases, flat files, or even real-time data streams. The first dataset could be received in various formats such as, CSV format for ease of manipulation and reading. Parallelly, a second dataset is also received. The second dataset contains predefined set of instructions (such as schema) against which the entries of the first dataset will be validated. The predefined set of instructions corresponds to the set of conformity standards required of each entry of the first dataset. The predefined sets of instructions can be stored in a format such as JSON. Once both datasets (the first dataset and the second dataset) are received, the next step is applying the predefined instructions (conformity standards) to the first dataset. Each entry within the first dataset is scrutinized based on the set of conformity standards. The set of conformity standards is designed to be dynamically configurable, allowing users, via input device 502, to update them as needed. The set of conformity standards may include checks like data type verification, range validation, pattern matching, etc. As each entry is assessed, the DVA 506 identifies entries that fail to meet the set of conformity standards. The non-conforming entries are marked or flagged for further investigation or correction. Optionally, detailed information related to each non-conforming entry may be logged to assist in debugging or audit trails. After the plurality of entries of the first dataset have been assessed, a consolidated assessment report is generated. The consolidated assessment report collates all the results, identifying which entries conform to the established standards and which fails to. consolidated assessment report can be saved in a database 508 for future auditing or data quality assessments. The last step in the method involves displaying the validation results using a display unit 510 and might take the form of an interactive dashboard.

Additional functionalities could also be added, such as the preliminary assessment of the entire file that corresponds to the first dataset before delving into individual entries. The system is also designed to be operating system-agnostic, making the system functional across various environments such as, but not limited to Windows and Unix. Overall, the method offers a robust, comprehensive, and automated approach to data validation, addressing the challenges often associated with ensuring data quality and integrity.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials, and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The terms "computer-readable medium" and "computer-readable storage medium" shall also include any medium that is capable of storing, encoding, or carrying a set of instructions for execution by a processor or that causes a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tape, or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application-specific integrated circuits, programmable logic arrays, and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

According to an aspect of the present disclosure, a non-transitory computer-readable storage medium storing instructions for performing automatic schema-based data validation is disclosed. The instructions include executable code which, when executed by a processor, may cause the processor to receive a first dataset that comprises a plurality of entries, the first dataset is received from at least one data source; receive a second dataset that comprises a predefined set of instructions corresponding to a set of conformity standards for validation of the first dataset; apply the predefined set of instructions to the received first dataset; validate each of the plurality of entries of the first dataset based on the application of the predefined set of instructions; generate a consolidated assessment report based on the validation; and display, using a display unit, the generated consolidated assessment report.

In an example, a university that collects student academic records in a CSV file. This is the "first dataset," containing a plurality of entries such as student names, grades, and course codes from various departments. The system responsible for validating the data has a "non-transitory computer-readable storage medium," essentially a section of server storage that holds executable code for the validation process. The code, when executed by the system's processor, triggers the validation process. The processor also receives a "second dataset," which is a predefined set of rules for what constitutes valid student academic records. The rules could be in JSON format, and might specify allowable data formats, numeric ranges for grades, and valid course codes. When the processor executes the code, the process starts by confirming that the overall structure of the first dataset (CSV file) is correct. The Processor then goes through each entry of the first dataset and checks each entry against the rules in the second dataset. If a record doesn't conform, such as a grade being inputted as text instead of a number, that entry is flagged as "non-conforming." After completing the check, the processor generates a "consolidated assessment report." The consolidated assessment report summarizes which entries were non-conforming and why, based on the rules from the second dataset. The consolidated assessment report can be displayed to system administrators via a graphical interface. The system also has the ability to log detailed information about each non-conforming entry for debugging purposes. All consolidated assessment reports are saved in a database, allowing the university to audit historical data validations. The entire validation process can run on multiple types of operating systems, including, but not limited to, Windows and Unix, making the process extremely versatile. Finally, because the rules in the second dataset are "dynamically configurable," system administrators can update them as university policies change, without needing to modify the core validation code.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for performing automatic schema-based data validation, the method being implemented by at least one processor, the method comprising:

receiving, by the at least one processor, a first dataset that comprises a plurality of entries, the first dataset is received from at least one data source;

receiving, by the at least one processor, a second dataset that comprises a predefined set of instructions corresponding to a set of conformity standards for validation of the first dataset, wherein the set of conformity standards includes: number formats comprising integer and floating-point formats, Boolean formats, date formats including at least one of yyyy/mm/dd, yyyymmdd, and dd-MMM-yyyy; email validation formats, enumeration of strings specifying an allowed list of string values, and plain string formats;

applying, by the at least one processor, the predefined set of instructions to the received first dataset;

validating, by the at least one processor, each of the plurality of entries of the first dataset based on the applying of the predefined set of instructions;

generating, by the at least one processor, a consolidated assessment report based on the validation; and displaying, by the at least one processor using a display unit, the generated consolidated assessment report, wherein the received first dataset corresponds to a data file having a plurality of rows and columns, and wherein the validation of the data file is performed at least in one of two levels, wherein:

a first level of the two levels corresponds to the validation of the complete data file at a time; and a second level of the two levels corresponds to the validation of each of the plurality of rows and columns in a sequential manner, and wherein the method further comprises:

parsing, by the at least one processor, the plurality of rows and columns into a plurality of segments, wherein each segment of the plurality of segments comprises at least one row and at least one column; and parallelly-validating, by the at least one processor, the parsed plurality of segments.

2. The method as claimed in claim 1, wherein the first dataset is received in at least one of a comma separated values (CSV) format, and a spreadsheet editor format.

3. The method as claimed in claim 1, wherein the validation of the plurality of entries further comprises analyzing a delimiter type, a structure of a header record, and a structure of a trailer record in the first dataset.

4. The method as claimed in claim 1, wherein the predefined set of instructions are received in a JavaScript Object Notation (JSON) format.

5. The method as claimed in claim 1, wherein the set of conformity standards is dynamically configurable based on a user input.

6. The method as claimed in claim 1, wherein the set of conformity standards comprises at least one of a data type check, a data range check, a date range check, and a pattern check.

7. The method as claimed in claim 1, wherein the method further comprises storing, by the at least one processor, the generated consolidated assessment report in a database for historical auditing purposes.

8. A computing device configured to implement an execution of a method for performing automatic schema-based data validation, the computing device comprising:

a processor;

a memory; and a communication interface coupled to each of the processor and the memory, wherein the processor is configured to:

receive a first dataset that comprises a plurality of entries, the first dataset is received from at least one data source;

receive a second dataset that comprises a predefined set of instructions corresponding to a set of conformity standards for validation of the first dataset, wherein the set of conformity standards includes: number formats comprising integer and floating-point formats, Boolean formats, date formats including at least one of yyyy/mm/dd, yyyymmdd, and dd-MMM-yyyy; email validation formats, enumeration of strings specifying an allowed list of string values, and plain string formats;

apply the predefined set of instructions to the received first dataset;

validate each of the plurality of entries of the first dataset based on the application of the predefined set of instructions;

generate a consolidated assessment report based on the validation; and display, using a display unit, the generated consolidated assessment report, wherein the received first dataset corresponds to a data file having a plurality of rows and columns, and wherein for the validation of the data file is performed at least in one of two levels, wherein:

a first level of the two levels corresponds to the validation of the complete data file at a time; and a second level of the two levels corresponds to the validation of each of the plurality of rows and columns in a sequential manner, and wherein the processor is further configured to:

parse the plurality of rows and columns into a plurality of segments, wherein each segment of the plurality of segments comprises at least one row and at least one column; and parallelly-validate the parsed plurality of segments.

9. The computing device as claimed in claim 8, wherein the first dataset is received in a comma separated values (CSV) format, and a spreadsheet editor format.

10. The computing device as claimed in 8, wherein to validate the plurality of entries, the processor is further configured to analyze a delimiter type, a structure of a header record, and a structure of a trailer record in the first dataset.

11. The computing device as claimed in claim 8, wherein the predefined set of instructions are received in a JavaScript Object Notation (JSON) format.

12. The computing device as claimed in claim 8, wherein the set of conformity standards are dynamically configurable by a user.

13. The computing device as claimed in claim 8, wherein the set of conformity standards comprises at least one of a data type check, a data range check, a date range check, and a pattern check.

14. The computing device as claimed in claim 8, wherein the processor is further configured to store the generated consolidated assessment report in a database for historical auditing purposes.

15. A non-transitory computer-readable storage medium storing instruction performing automatic schema-based data validation, the storage medium comprising executable code which, when executed by a processor, causes the processor to:

receive a first dataset that comprises a plurality of entries, the first dataset is received from at least one data source;

receive a second dataset that comprises a predefined set of instructions corresponding to a set of conformity standards for validation of the first dataset, wherein the set of conformity standards includes: number formats comprising integer and floating-point formats, Boolean formats, date formats including at least one of yyyy/mm/dd, yyyymmdd, and dd-MMM-yyyy; email validation formats, enumeration of strings specifying an allowed list of string values, and plain string formats;

apply the predefined set of instructions to the received first dataset;

validate each of the plurality of entries of the first dataset based on the application of the predefined set of instructions;

generate a consolidated assessment report based on the validation; and display, using a display unit, the generated consolidated assessment report, wherein the received first dataset corresponds to a data file having a plurality of rows and columns, and wherein for the validation of the data file is performed at least in one of two levels, wherein:

a first level of the two levels corresponds to the validation of the complete data file at a time; and a second level of the two levels corresponds to the validation of each of the plurality of rows and columns in a sequential manner, and wherein the executable code which, when executed by the processor, causes the processor to:

parse the plurality of rows and columns into a plurality of segments, wherein each segment of the plurality of segments comprises at least one row and at least one column; and parallelly-validate the parsed plurality of segments.

16. The non-transitory computer-readable storage medium as claimed in claim 15, wherein the first dataset is received in at least one of a comma separated values (CSV) format, and a spreadsheet editor format.

17. The non-transitory computer-readable storage medium as claimed in claim 15, wherein the validation of the plurality of entries further comprises analyzing a delimiter type, a structure of a header record, and a structure of a trailer record in the first dataset.

18. The non-transitory computer-readable storage medium as claimed in claim 15, wherein the set of conformity standards are dynamically configurable by a user.

19. The non-transitory computer-readable storage medium as claimed in claim 15, wherein the set of conformity standards comprises at least one of a data type check, a data range check, a date range check, and a pattern check.

20. The non-transitory computer-readable storage medium as claimed in claim 15, wherein the executable code which, when executed by the processor, causes the processor to store the generated consolidated assessment report in a database for historical auditing purposes.

* * * * *